E. A. VESSEY.
SCREW PROPELLER.
APPLICATION FILED SEPT. 21, 1920.
1,438,413.
Patented Dec. 12, 1922.
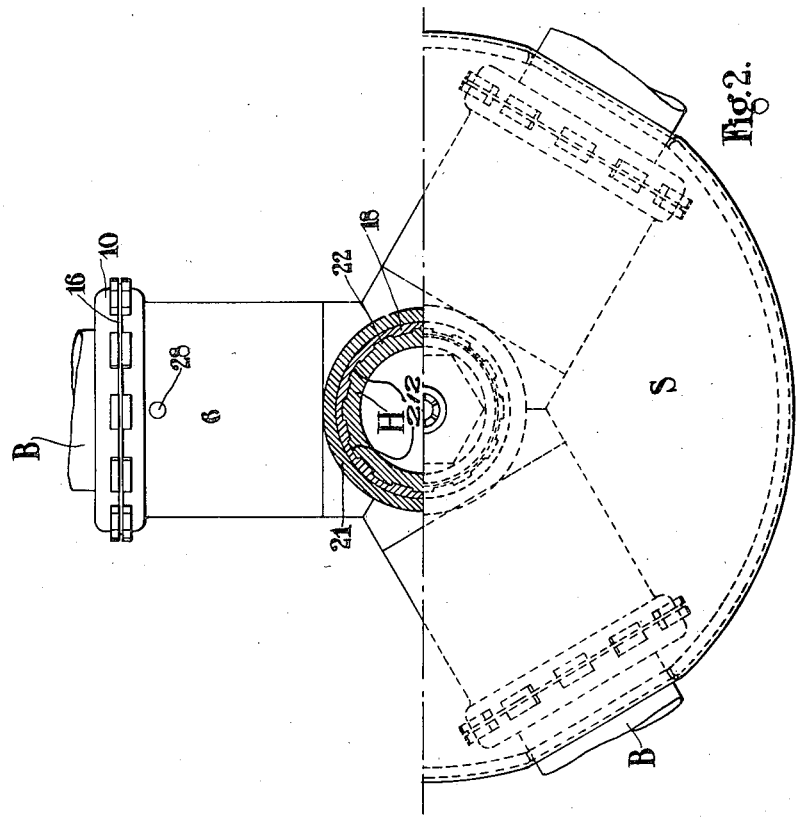
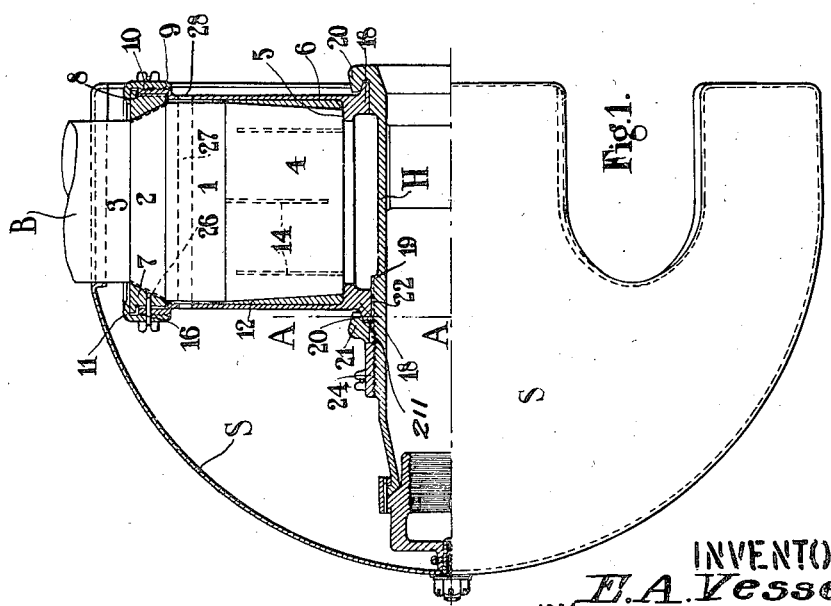
INVENTOR
E. A. Vessey,
BY H. R. Kerslake
ATTORNEY Patented Dec. 12, 1922.

1,438,413

UNITED STATES PATENT OFFICE.

ERNEST ABINGTON VESSEY, OF LONDON, ENGLAND.

SCREW PROPELLER.

Application filed September 21, 1920. Serial No. 411,766.

*To all whom it may concern:*

Be it known that I, ERNEST ABINGTON VESSEY, a subject of the King of Great Britain and Ireland, and residing at 7 Windsor Road, Church End, Finchley, London, N. 3., England, have invented certain new and useful Improvements Relating to Screw Propellers, of which the following is a specification.

This invention relates to a method of and means for fastening the blades of a screw propeller to the hub. The object of the invention is to provide a propeller with interchangeable detachable blades, such that while in operation the propeller is of fixed pitch, the pitch of each blade may be initially adjusted while fastening it to the hub, by rotation about an axis at right angles or nearly so to the propeller shaft. Such initial adjustment is of great value in many cases. For example, in an aircraft with two or more sets of engines and propellers all nominally alike, it is found that one propeller may run faster than another under the same driving conditions. By means of my invention the pitch of the propeller blades may be slightly adjusted and set, so that all the propellers may be tuned up to run at the same speed under the same driving conditions.

While the invention is applicable to marine propellers it is particularly applicable to air-screws.

The invention consists in detachable blades having spigot ends turned to a suitable profile, bored socket pieces integral with or detachably fastened to the hub of the propeller, and means for fastening the spigot ends of the blades in fixed definite relationship to the socket pieces.

The invention also consists in a propeller comprising a hub with an undercut flange at one end, a loose undercut flange or ring, socket pieces to hold the blades each having a flanged base adapted to be secured to the hub by means of the said undercut flanges, and means for fastening together the socket pieces and loose flange in fixed relationship to the hub.

I append drawings illustrating my invention as carried into effect in one form as applied to an air-screw.

Figure 1 is a sectional view on a plane passing through the axes of the hub and of a socket piece.

Figure 2 is an end view, partly in section at AA of Figure 1, of a three-bladed propeller, the upper part having the external casing removed.

Figure 3 is an end elevation of one of the split rings removed.

The spigot end 1 of each wooden propeller blade is turned with two conical surfaces, one a short steep part 2 of greater diameter than the root 3 of the shaped part of the blade B, the other an opposed slightly taper surface 4 formed by reducing the diameter of the spigot towards its inner end which abuts against the bottom 5 of the bore of the socket piece 6. A split turned ring or washer 7 rests on the conical surface 2 near the root of the shaped part of the blade, and it is castellated at 8 or keyed or otherwise shaped so as to be lodged in the mouth of the socket without being capable of turning relative thereto. The outer end of the socket piece is screwed externally at 9, and a ring nut 10 with inturned flange 11 engaging with the washer 7 is screwed on the end of the socket piece and fastens the blade radially in position. The spigot is also thereby firmly secured laterally in all directions at the mouth of the socket. The space between the tapered inner end of the spigot and the cylindrical bore of the socket is occupied by a tapered wedge sleeve 12 partially slit axially at a number of places 14 alternately from each edge so that it possesses sufficient radial elasticity. If the wooden spigot should shrink slightly, the wedge sleeve is forced slightly outwards under the influence of centrifugal force until it is pressed tightly between the spigot and the socket, thus automatically securing the inner end of the spigot laterally in all directions.

The washer 7 is split, in order that it may be assembled in position, but the ring nut is made in one piece bored sufficiently large to pass over the part 1 of largest diameter of the spigot of the blade. The ring nut is locked in position by a locking wire circlip 16 or other device.

To permit of adjustment of the pitch of the blade by definite amounts, the conical surface of the washer aforesaid may be provided with serrations 26 at equal angular intervals which, biting into the conical part 2 of the wooden spigot, prevent the blade from rotating in the socket. Thus with 360 fine serrations, the blade can be adjusted through any multiple of 1 degree.

An air screw is preferably made with detachable socket pieces. In this case the various socket pieces 6 are suitably assembled and held during the machining operations; their flanged bases 18 which are to fit in the vicinity of the hub flange are bored cylindrically at 19 to fit on a corresponding cylindrical surface of the hub. The front and rear surfaces of the flange bases are turned conical at 20 so as to form wedges which engage with the undercut flange of the hub H and loose flange 21, which are turned to suit. The loose flange 21 may engage with the hub by castellations 211 or the like so that relative turning is prevented. Preferably, for the purpose of transmitting the torque, one end of the flanged bases of the socket pieces may be castellated at 22 so as to engage with the hub castellations 212 with which the castellations 211 of the loose flange 21 also engage. In this case the parts may be secured by a nut 24 screwed on the hub and bearing against the loose flange 21.

A hole 27 drilled in the blade root in definite angular relationship with the blade face is arranged to come in line with holes 28 in the walls of the socket 6 in order to angularly locate the blades during assembly.

To reduce the windage, the socket pieces are enclosed within a light shell or external casing S of suitable stream-line shape.

In a marine propeller, the blades being made of metal, shrinkage of the spigots cannot arise, and the taper wedge sleeve above referred to is not required. The inner parts of the sockets may be bored to the same taper as that on the inner ends of the spigots of the blades. The taper in this case may be steeper than that on the spigots of the wooden blades of an air-screw. In a marine propeller also, the hub and sockets are preferably made in one casting.

By means of my invention, air screws having three or four blades can be made quite as conveniently and efficiently as two-blade air screws. Further, spare blades can easily be carried on an aircraft, and a broken blade can be conveniently replaced by a new spare blade, an operation impossible with air-screws as constructed hitherto.

Having now particularly described and ascertained the nature of my said invention and in what manner the same is to be performed, I declare that what I claim is:—

1. A fixed pitch screw propeller comprising a hub, detachable blades having turned tapered spigot ends, bored socket pieces on the hub, means for fastening the spigot ends of the blades in fixed but variable relationship to the socket pieces, and elastic wedge sleeves between the socket pieces and the tapered spigot ends of the blades.

2. A screw propeller as set forth in claim 1, comprising also a short steep conical surface on each blade spigot of greater diameter than the root of the shaped part of the blade, a split ring or washer resting on said conical surface, and a ring nut screwed on the end of the socket piece and engaging with the split washer.

3. A screw propeller as set forth in claim 1, comprising a hub with undercut flange at one end, a loose undercut flange, socket pieces to hold the blades each having a flanged base adapted to be secured to the hub by means of said undercut flanges, and means for fastening the socket pieces and loose flange together in fixed relationship to the hub.

4. An air-screw as set forth in claim 1 in which the socket pieces are bored cylindrically, and the elastic wedge sleeves are axially slit at a number of places and fit between the cylindrical bores of the socket pieces and tapered inner ends of the blade spigots, the said sleeves being wedged tight by centrifugal force.

In testimony whereof I have signed my name to this specification.

ERNEST ABINGTON VESSEY.